(12) United States Patent
Fujii et al.

(10) Patent No.: US 10,274,061 B2
(45) Date of Patent: Apr. 30, 2019

(54) BALL SCREW

(71) Applicant: THK CO., LTD., Tokyo (JP)

(72) Inventors: Kenji Fujii, Tokyo (JP); Masahiko Yoshino, Tokyo (JP); Tsutomu Togashi, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 15/529,717

(22) PCT Filed: Dec. 25, 2015

(86) PCT No.: PCT/JP2015/086173
§ 371 (c)(1),
(2) Date: May 25, 2017

(87) PCT Pub. No.: WO2016/104676
PCT Pub. Date: Jun. 30, 2016

(65) Prior Publication Data
US 2017/0335933 A1 Nov. 23, 2017

(30) Foreign Application Priority Data

Dec. 26, 2014 (JP) ................................. 2014-265564
Dec. 24, 2015 (JP) ................................. 2015-251693

(51) Int. Cl.
*F16H 25/22* (2006.01)
(52) U.S. Cl.
CPC ............................... *F16H 25/2223* (2013.01)
(58) Field of Classification Search
CPC . F16H 1/003; F16H 1/006; F16H 1/02; F16H 25/2204
See application file for complete search history.

(56) References Cited

U.S. PATENT DOCUMENTS 2,924,113 A * 2/1960 Orner .................. F16H 25/2209
74/424.86
3,198,029 A * 8/1965 Orner .................. F16H 25/2209
74/424.87

(Continued)

FOREIGN PATENT DOCUMENTS

CN 1871460 A 11/2006
JP 10-153245 6/1998

(Continued)

OTHER PUBLICATIONS

Chinese Official Action dated Jan. 3, 2018; Application No. 201580070805.6.

(Continued)

*Primary Examiner* — Zakaria Elahmadi
(74) *Attorney, Agent, or Firm* — Young & Thompson

(57) ABSTRACT

Provided is a ball screw capable of reducing unevenness of load distribution of balls and extending a service life of the ball screw. In the ball screw, one end part 6 of a nut 2 on a flange 2-2 side is closer to an end 9 of a screw shaft 1 on a fixed side than the other end part 7 of the nut 2 on a side opposite the flange 2-2 is, two or more circulation paths 5a to 5c are arranged in an axial direction of the nut 2, and a diameter of a ball 3a in the circulation path 5a closest to the flange 2-2 of the nut 2 is smaller than a diameter of a ball 3c in the circulation path 5c remotest from the flange 2-2 of the nut 2.

4 Claims, 15 Drawing Sheets

(56) References Cited

U.S. PATENT DOCUMENTS

| | | | | |
|---|---|---|---|---|
| 5,467,662 A * | 11/1995 | Lange | .................... | F16C 19/505 |
| | | | | 74/424.83 |
| 6,082,209 A * | 7/2000 | Yabe | .................... | F16H 25/2204 |
| | | | | 74/424.83 |
| 6,397,697 B1 * | 6/2002 | Ninomiya | ........... | F16H 25/2223 |
| | | | | 74/424.83 |
| 9,151,371 B2 * | 10/2015 | Sugita | .................. | F16H 25/2223 |
| 2005/0087031 A1 * | 4/2005 | Ohkubo | .............. | F16H 25/2223 |
| | | | | 74/424.85 |
| 2007/0137347 A1 | 6/2007 | Teramachi | | |
| 2011/0146436 A1 * | 6/2011 | Brown | ................ | F16H 25/2223 |
| | | | | 74/424.82 |
| 2012/0090419 A1 * | 4/2012 | Kuo | .................... | F16H 25/2223 |
| | | | | 74/424.86 |
| 2014/0007567 A1 * | 1/2014 | Stewart | .................... | F03B 13/00 |
| | | | | 60/495 |
| 2016/0033019 A1 * | 2/2016 | Aramoto | ................. | F16D 65/18 |
| | | | | 74/424.81 |
| 2016/0273633 A1 * | 9/2016 | Heck | .................... | F16H 25/2223 |

FOREIGN PATENT DOCUMENTS

| | | |
|---|---|---|
| JP | 2000-320637 | 11/2000 |
| JP | 2001-065662 | 3/2001 |
| JP | 2009-030809 | 2/2009 |

OTHER PUBLICATIONS

International Search Report, PCT/JP2015/086173, dated Feb. 16, 2016.

* cited by examiner

BALL SCREW

TECHNICAL FIELD

The present invention relates to a ball screw in which a plurality of balls is interposed between a screw shaft and a nut in a rollable manner.

BACKGROUND ART

A ball screw includes a screw shaft, a nut, and a plurality of balls interposed between the screw shaft and the nut (refer to Patent Literature 1, for example). A helical ball rolling groove where the balls roll is formed on an outer peripheral surface of the screw shaft. A helical loaded ball rolling groove facing the ball rolling groove of the screw shaft is formed on an inner peripheral surface of the nut. Since agile movement can be obtained by rolling motion of the balls, the ball screw is used as a machine element adapted to convert rotational movement to linear movement or convert linear movement to rotational movement.

The nut is provided with a return path connected between one end and the other end of the loaded ball rolling groove of the nut in order to circulate the balls. The return path constitutes part of a circulation path. When the screw shaft is rotated relative to the nut, the balls interposed between the screw shaft and the nut roll therebetween. A ball having rolled to the one end of the loaded ball rolling groove of the nut enters the return path, and returns to the other end of the loaded ball rolling groove of the nut after passing through the return path. Then, the ball rolls to the one end of the loaded ball rolling groove again.

CITATION LIST

Patent Literature

Patent Literature 1: JP 2009-30809 A

SUMMARY OF INVENTION

Technical Problem

The nut is provided with a flange as an attachment part to be attached to a mating component. When the ball screw is operated, the nut is axially moved relative to the screw shaft, and an axial load is applied to the nut via the flange. When the axial load is applied to the nut, the balls interposed between the ball rolling groove of the screw shaft and the loaded ball rolling groove of the nut are compressed, and reaction forces of the balls act on the nut and the screw shaft.

The nut and the screw shaft are typically made of steel and are nearly rigid bodies. However, since the nut and the screw shaft are bodies elastically deformable, when the axial load is applied to the nut, both the nut and the screw shaft are slightly elastically deformed in the axial direction by the reaction force of the balls. Deformation amounts of the nut and the screw shaft in the axial direction vary depending on the distance from the flange of the nut, which is a position where the load is applied (this will be described in detail later). A clearance between the ball rolling groove of the screw shaft and the loaded ball rolling groove of the nut also vary depending on the distance from the flange of the nut, and the clearance close to the flange is smaller than the clearance remote from the flange. Therefore, a load on the ball located in the clearance close to the flange is larger than a load on the ball located in the clearance remote from the flange. Such unevenness of load distribution of the balls may be a cause to shorten a service life of the ball screw.

Therefore, an object of the present invention is to provide a ball screw capable of reducing unevenness of load distribution of balls and extending a service life of the ball screw.

Solution to Problem

To solve the above-described problem, an aspect of the present invention provides a ball screw including: a screw shaft having a helical ball rolling groove formed on an outer peripheral surface thereof; a nut having a helical loaded ball rolling groove formed on an inner peripheral surface thereof and facing the ball rolling groove, the nut further including an attachment part to be attached to a mating component; a plurality of balls interposed between the ball rolling groove of the screw shaft and the loaded ball rolling groove of the nut in a rollable manner; and a circulation path including a return path connected between one end and the other end of the loaded ball rolling groove of the nut, and configured to circulate the balls, wherein one end part of the nut on the attachment part side is closer to an end of the screw shaft on a fixed side than the other end part of the nut on a side opposite the attachment part is, and two or more circulation paths are arranged in an axial direction of the nut, with a diameter of the ball in the circulation path closest to the attachment part of the nut being smaller than a diameter of the ball in the circulation path remotest from the attachment part of the nut.

Another aspect of the present invention provides a ball screw including: a screw shaft having a helical ball rolling groove formed on an outer peripheral surface thereof; a nut having a helical loaded ball rolling groove formed on an inner peripheral surface thereof and facing the ball rolling groove, the nut further including an attachment part to be attached to a mating component; a plurality of balls interposed between the ball rolling groove of the screw shaft and the loaded ball rolling groove of the nut in a rollable manner; and a circulation path including a return path connected between one end and the other end of the loaded ball rolling groove of the nut, and configured to circulate the plurality of balls, wherein one end part of the nut on the attachment part side is remoter from an end of the screw shaft on a fixed side than the other end part of the nut on a side opposite the attachment part is, two or more circulation paths are arranged in an axial direction of the nut, in the case where a cross-sectional area of the nut is larger than a cross-sectional area of the screw shaft, a diameter of the ball in the circulation path closest to the attachment part of the nut is larger than a diameter of the ball in the circulation path remotest from the attachment part of the nut, and in the case where a cross-sectional area of the nut is smaller than a cross-sectional area of the screw shaft, the diameter of the ball in the circulation path closest to the attachment part of the nut is smaller than the diameter of the ball in the circulation path remotest from the attachment part of the nut.

Advantageous Effects of Invention

According to the present invention, loads on balls can be leveled between two or more circulation paths. Therefore, unevenness of load distribution of the balls can be reduced, and a service life of the ball screw can be extended. Additionally, since the unevenness of load distribution of the balls can be reduced without providing any special processing to the loaded ball rolling groove of the nut, manufacture of the ball screw is facilitated.

DESCRIPTION OF EMBODIMENTS

First Embodiment

Figure 1:
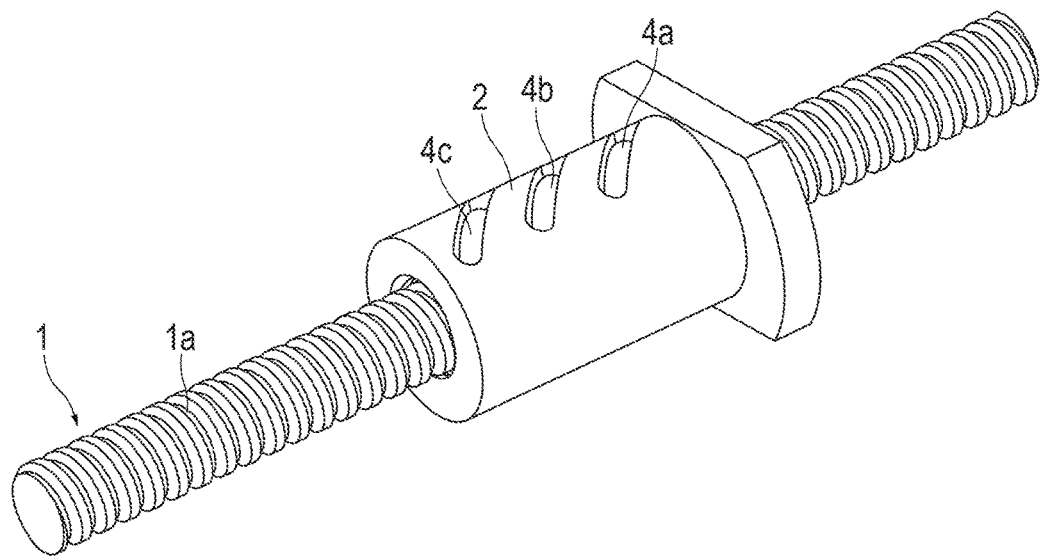
FIG. 1 is an external perspective view of a ball screw according to a first embodiment of the present invention.

In the following, a ball screw according to a first embodiment of the present invention will be described in detail with reference to the attached drawings. FIG. 1 is an external perspective view of the ball screw according to the present embodiment. As illustrated in FIG. 1, the ball screw includes a screw shaft 1 and a nut 2 surrounding the screw shaft 1 and having a common axial line with the screw shaft 1.

The screw shaft 1 has a helical ball rolling groove 1a having a constant lead formed on an outer peripheral surface thereof. The ball rolling groove 1a has a cross-sectional shape of a Gothic arch groove formed by combining two arcs. The arc of the Gothic arch groove has a radius larger than a radius of a ball 3 (refer to FIG. 2). The ball 3 contacts the ball rolling groove 1a of the screw shaft 1 at two points. The number of the ball rolling grooves 1a can be suitably set, for example, one, two, three, or the like. In this embodiment, one ball rolling groove is illustrated.

Figure 2:
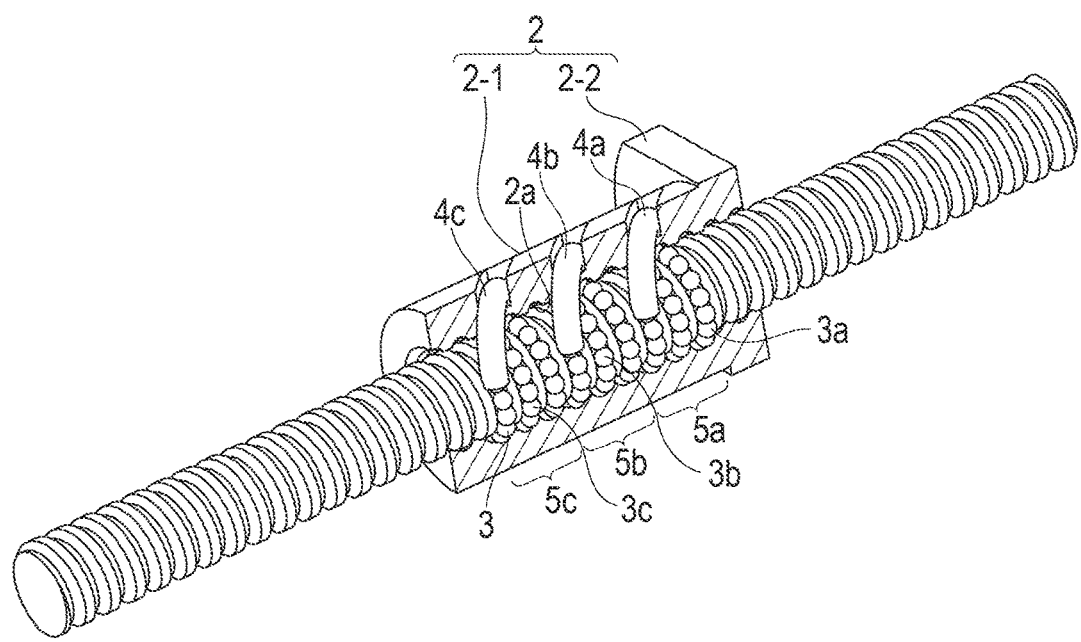
FIG. 2 is a perspective view of the above ball screw (including a cross-section taken along an axial line of a nut).

FIG. 2 is a perspective view of the ball screw with a cross-section of the nut taken along the axial line thereof. The nut 2 includes a cylindrical-shaped body portion 2-1 and a flange 2-2 as an attachment part provided at one end part in the axial direction of the body portion 2-1. The flange 2-2 is provided with attachment holes (not illustrated) adapted to attach the nut 2 to a mating component. The nut 2 has a helical loaded ball rolling groove 2a facing the ball rolling groove 1a of the screw shaft 1, formed on an inner peripheral surface thereof. The lead and the number of the loaded ball rolling grooves 2a are equal to the lead and the number of the ball rolling grooves 1a. The loaded ball rolling groove 2a also has a cross-sectional shape of a Gothic arch groove formed by combining two arcs. The ball 3 contacts the loaded ball rolling groove 2a of the nut 2 at two points.

As illustrated in FIG. 1, return pipes 4a, 4b, 4c to circulate the balls 3 are mounted on the nut 2. Each of the return pipes 4a, 4b, 4c has a U-shape. Leg portions of the return pipes 4a, 4b, 4c at their both ends penetrate the nut 2 and reach the loaded ball rolling groove 2a of the nut 2. Each of the return pipes 4a, 4b, 4c includes a return path connected between one end and the other end of the loaded ball rolling groove 2a of the nut 2. A ball 3 having rolled to the one end of the loaded ball rolling groove 2a of the nut 2 enters the return path in each of the return pipes 4a, 4b, 4c, and returns to the other end of the loaded ball rolling groove 2a of the nut 2 after passing through the return path in each of the return pipes 4a, 4b, 4c. Circulation paths 5a, 5b, 5c are configured by the loaded ball rolling groove 2a of the nut 2 and the return paths of the return pipes 4a, 4b, 4c.

In this embodiment, the three return pipes 4a, 4b, 4c are arranged in the axial direction of the nut 2. The three circulation paths 5a, 5b, 5c in the axial direction are configured by the three return pipes 4a, 4b, 4c. In the following, the three circulation paths 5a, 5b, 5c will be defined as a first circulation path 5a, a second circulation path 5b, and a third circulation path 5c in a direction from a side close to the flange 2-2 of the nut 2 toward a side remote from the flange 2-2 of the nut 2. The first to third circulation paths 5a, 5b, 5c are apart from each other in the axial direction of the nut 2.

The number of turns in the loaded ball rolling groove 2a of the nut 2 illustrated in FIG. 2 is 2.5 turns. Each of the return paths of the return pipes 4a, 4b, 4c is connected between one end and the other end of the loaded ball rolling groove 2a having the number of turns of 2.5. The number of turns in the loaded ball rolling groove 2a of the nut 2 is not limited to 2.5 turns, and the number of turns can be optionally set to, for example, 1, 1.5, 2, 2.5, 3, 3.5, or the like, in accordance with an allowable load.

Figure 3:
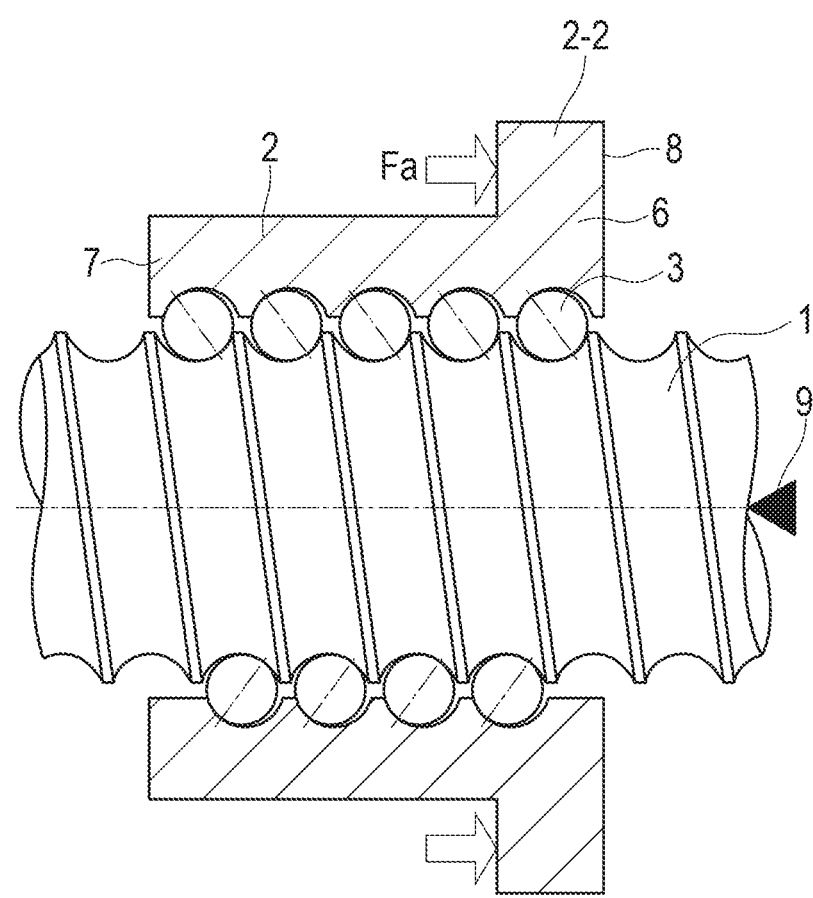
FIG. 3 is a cross-sectional view of the ball screw when an axial load is applied to a flange of the nut (when a load Fa is applied to a fixed end side of the screw shaft).

When the screw shaft 1 is rotated relative to the nut 2, the nut 2 is linearly moved in the axial direction. As illustrated in FIG. 3, when the nut 2 is linearly moved, an axial load Fa is applied to the flange 2-2 of the nut 2. When the axial load Fa is applied to the flange 2-2 of the nut 2, compressive loads act on the balls 3. Then, reaction forces of the balls 3 act on the nut 2 and screw shaft 1.

Figure 4:
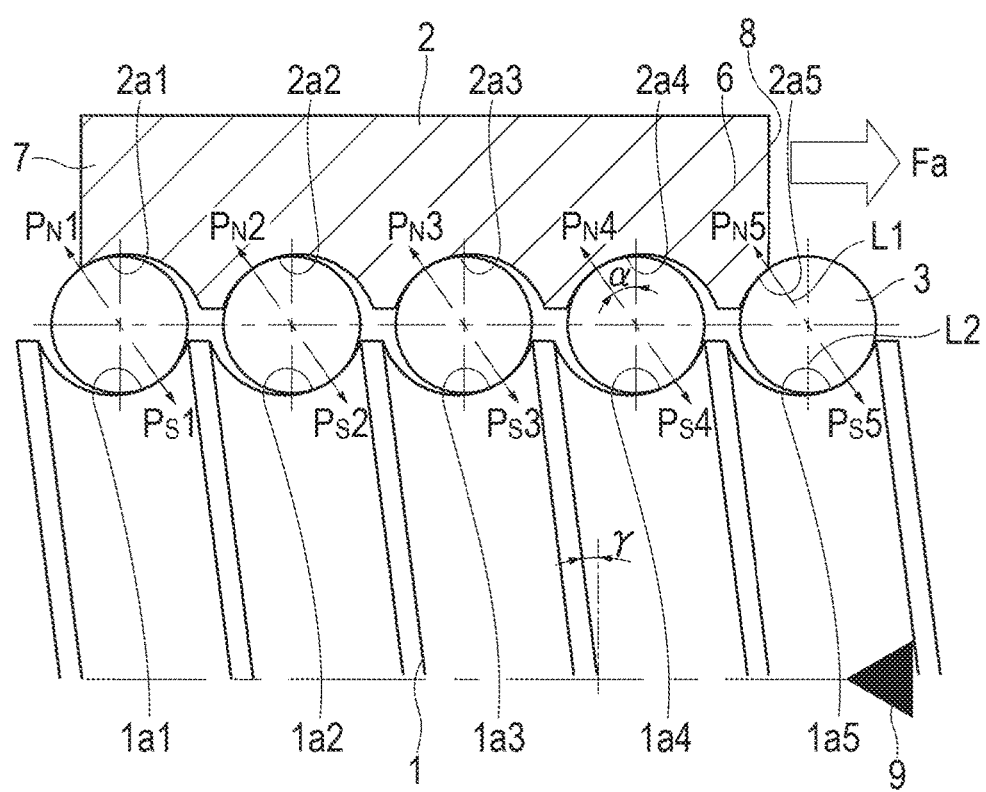
FIG. 4 is a cross-sectional view of the ball screw illustrating reaction force acting on balls when the axial load is applied to the flange of the nut.

In the following, deformation of the nut 2 and the screw shaft 1 when the load Fa in the axial direction is applied to the nut 2 will be described with reference to FIGS. 3 and 4. In FIGS. 3 and 4, illustrated is a state in which the return pipes 4a, 4b, 4c are detached, but actually, the return pipes 4a, 4b, 4c are attached and the balls 3 are divided into each of the circulation paths 5a, 5b, 5c.

As described above, when the axial load Fa is applied to the flange 2-2 of the nut 2, compressive loads act on the balls 3 and reaction forces of the ball 3 act on the nut 2 and the screw shaft 1. The reaction forces of the balls 3 act in a direction of a contact angle line L1. Here, the contact angle line L1 is a line connecting a contact point between the ball 3 and the loaded ball rolling groove 2a to a contact point between the ball 3 and the ball rolling groove 1a.

Assuming that the nut 2 and the screw shaft 1 are rigid bodies and only the ball 3 is elastically deformed, the nut 2 is displaced in the axial direction (rightward in the drawing) by compressive deformation of the ball 3. The loaded ball rolling groove 2a of the nut 2 is also uniformly displaced in the axial direction (rightward in the drawing) regardless of the distance from the flange 2-2.

However, the nut 2 and the screw shaft 1 are not the rigid bodies but are bodies which are elastically deformable. The nut 2 and the screw shaft 1 are elastically deformed by reaction forces $P_N 1$ to $P_N 5$ and $P_S 1$ to $P_S 5$ of the balls 3 as described below.

Figure 5:
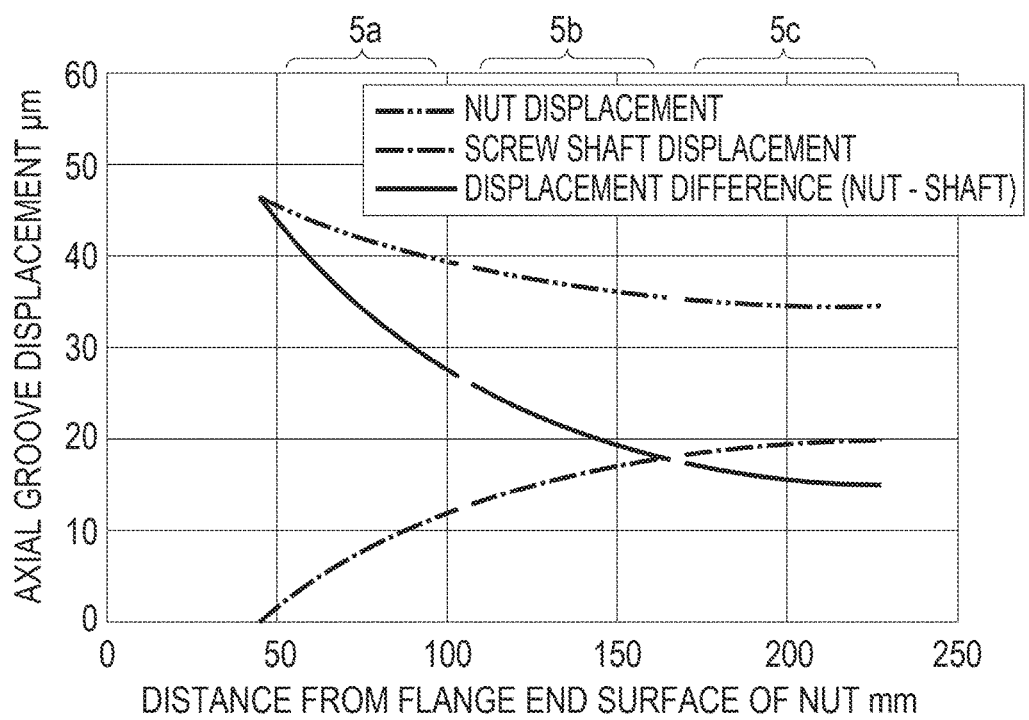
FIG. 5 is a graph illustrating a relation between a distance from a flange end surface of the nut and axial groove displacement of the nut and the screw shaft.

First, elastic deformation of the screw shaft 1 will be described. The reaction forces $P_S 1$ to $P_S 5$ of the balls 3 act on the ball rolling groove 1a of the screw shaft 1. Specifically, the reaction force $P_S 5$ acts on the ball rolling groove 1a5, the reaction force $P_S 4$ acts on the ball rolling groove 1a4, the reaction force $P_S 3$ acts on the ball rolling groove 1a3, the reaction force $P_S 2$ acts on the ball rolling groove 1a2, and the reaction force $P_S 1$ acts on the ball rolling groove 1a1. In the case where the screw shaft 1 is fixed at the right end (position ▲ in FIG. 4), the elastic deformation amounts in the axial direction (rightward) of the ball rolling grooves 1a1 to 1a5 of the screw shaft 1 are more increased with distance from the flange 2-2 of the nut 2. In other words, the ball rolling groove 1a1 on the left side, which is remotest from the flange 2-2, is most displaced in the axial direction (rightward). The dot-and-dash line in FIG. 5 represents axial displacement of the ball rolling groove 1a of the screw shaft 1. As illustrated in the line on the lower side of the graph in FIG. 5, the axial (rightward) displacement of the ball rolling groove 1a of the screw shaft 1 is increased with distance from an end surface 8 of the flange 2-2 of the nut 2 (refer to FIGS. 3 and 4). The reason why each of the lines in the graph of FIG. 5 is cut into three sections is that there are the three circulation paths 5a, 5b, 5c.

The position ▲ in FIGS. 3 and 4 represents an end 9 on the fixed side of the screw shaft 1. For example, in the case where one end part of the screw shaft 1 in the axial direction is a fixed end and the other end part is a free end, the fixed end corresponds to the end 9 on the fixed side of the screw shaft 1. Additionally, in the case where both ends of the screw shaft 1 in the axial direction are supported by bearings in a rotatable manner, one end part supported by the bearing configured to receive a larger axial load corresponds to the end 9 on the fixed side.

Next, elastic deformation of the nut 2 will be described. One end part 6 of the nut 2 on the flange 2-2 side is closer to the end 9 of the screw shaft 1 on the fixed side than the other end part 7 of the nut 2 on the side opposite the flange 2-2 is. In the nut 2, the axial load Fa is applied to the flange 2-2 and the reaction forces $P_N 1$ to $P_N 5$ of the balls 3 act on the loaded ball rolling grooves 2a. The direction of the axial load Fa and the directions of the reaction forces $P_N 1$ to $P_N 5$ are opposite to each other. Specifically, the reaction force $P_N 5$ of the ball 3 acts on the loaded ball rolling groove 2a5 of the nut 2, the reaction force $P_N 4$ acts on the loaded ball rolling groove 2a4, the reaction force $P_N 3$ acts on the loaded ball rolling groove 2a3, the reaction force $P_N 2$ acts on the loaded ball rolling groove 2a2, and the reaction force $P_N 1$ acts on the loaded ball rolling groove 2a1. The loaded ball rolling grooves 2a1 to 2a5 are displaced in the axial direction (rightward) by the axial load Fa applied to the flange 2-2, but are displaced leftward by the reaction forces of the balls 3 with distance from the flange 2-2. As a result, the loaded ball rolling groove 2a5 located on the rightmost side closest to the flange 2-2 is most displaced in the axial direction (rightward), and the axial (rightward) displaced amount is decreased with distance from the flange 2-2. The alternate long and two short dashes line in FIG. 5 represents axial displacement of the ball rolling groove 2a of the nut 2. As illustrated by the line on the upper side of the graph of FIG. 5, the axial (rightward) displacement of the loaded ball rolling groove 2a close to the end surface 8 of the flange 2-2 of the nut 2 (refer to FIGS. 3 and 4) is large. The axial (rightward) displacement of the loaded ball rolling groove 2a is reduced with distance from the end surface 8 of the flange 2-2 of the nut 2.

Figure 6:
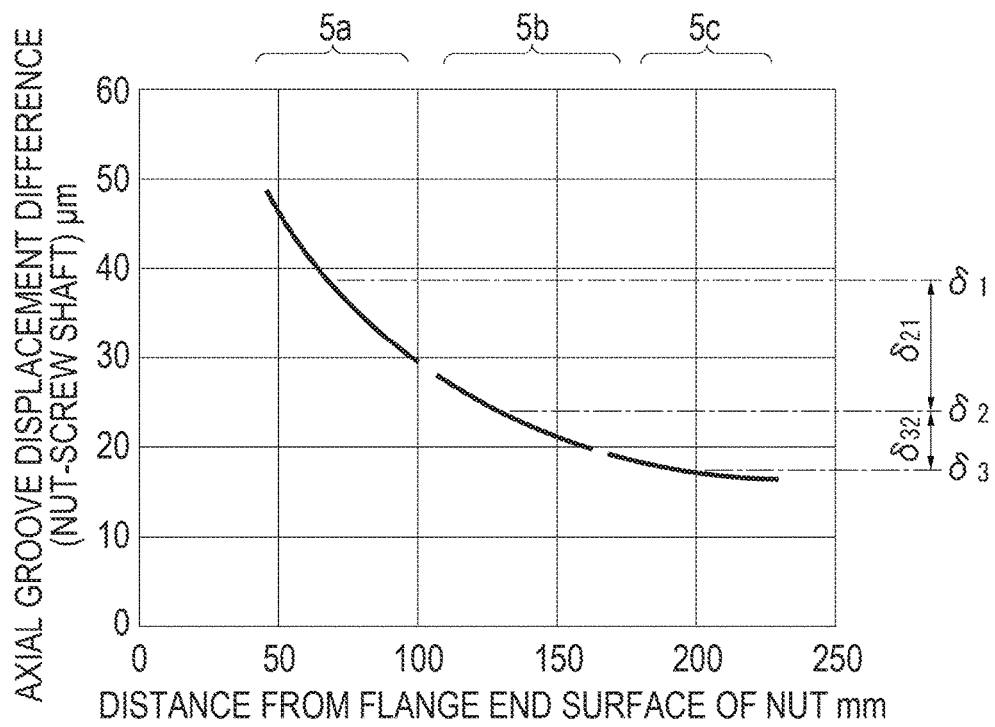
FIG. 6 is a graph illustrating a relation between a distance from the flange end surface of the nut and an axial groove displacement difference (nut–screw shaft).

The amount of change of an axial clearance can be calculated by subtracting axial (rightward) displacement of the ball rolling grooves 1a1 to 1a5 of the screw shaft 1 from axial (rightward) displacement of the loaded ball rolling grooves 2a1 to 2a5 of the nut 2. The solid line in FIG. 5 is obtained by subtracting the displacement of the ball rolling grooves 1a1 to 1a5 of the screw shaft 1 from the axial displacement of the loaded ball rolling grooves 2a1 to 2a5 of the nut. FIG. 6 is obtained by extracting only a displacement difference from the graph of FIG. 5. In the vertical axis in the graph of FIG. 6, the amount of change of a clearance is represented as an "axial groove displacement difference (nut–screw shaft)". As illustrated in the graph of FIG. 6, the axial groove displacement difference is increased in a quadratic curve with approach to the flange 2-2 of the nut 2. Here, increase of the axial groove displacement difference indicates decrease of the clearance. Therefore, the axial clearance between the loaded ball rolling groove 2a and the ball rolling groove 1a is decreased with approach to the flange 2-2 of the nut 2. The reason why the line in the graph of FIG. 6 is cut into three sections is that there are the three circulation paths 5a, 5b, 5c.

Figure 7:
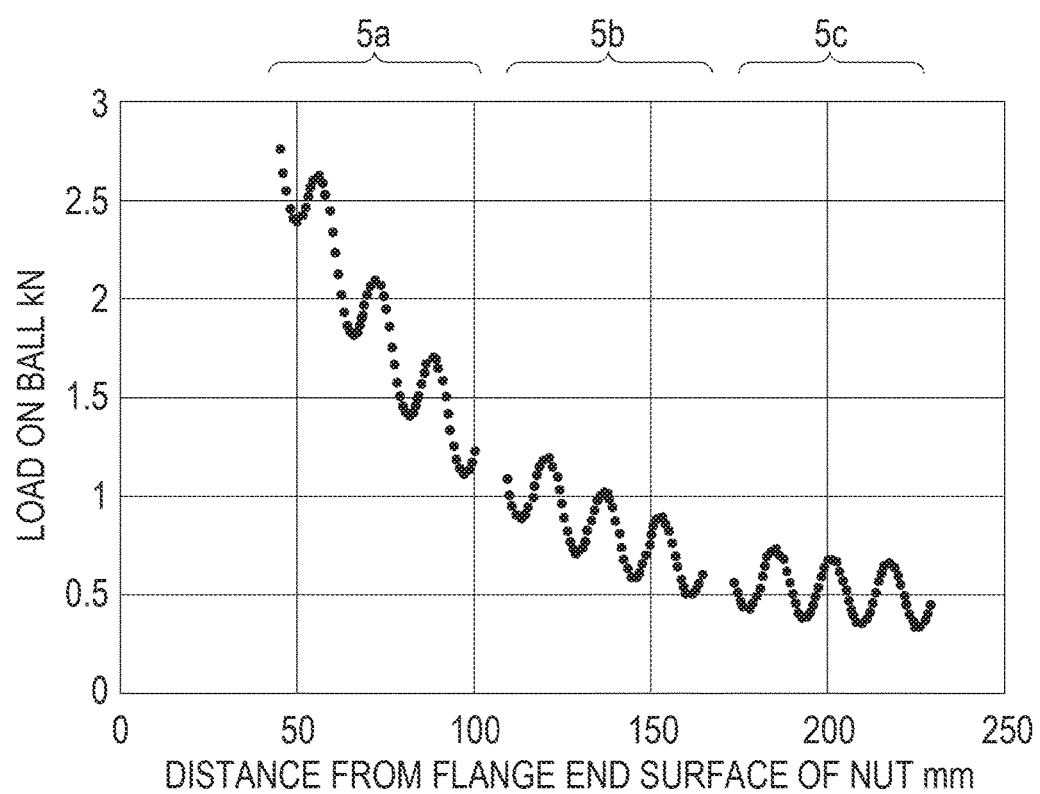
FIG. 7 is a graph illustrating load distribution of balls.

FIG. 7 illustrates load distribution of the balls 3. The horizontal axis in the graph of FIG. 7 represents the distance from the flange end surface, and the vertical axis in the graph of FIG. 7 represents the load on the ball. As illustrated in FIG. 6 above, the axial clearance between the loaded ball rolling groove 2a and the ball rolling groove 1a is decreased with approach to the flange 2-2. Therefore, as illustrated in FIG. 7, the load on the ball 3 is increased in a quadratic curve with approach to the flange 2-2. The reason why the line in the graph of FIG. 7 is undulant is that the load on the ball 3 is varied by a circumferential position of the screw shaft 1. The graph of FIG. 7 represents an example in which each of the circulation paths is configured by the loaded ball rolling groove 2a having the number of turns of 3.5. The same tendency is observed also in the case where each of the circulation paths is configured by the loaded ball rolling groove 2a having the number of turns of 2.5 as illustrated in FIG. 2.

Unevenness of the load distribution of the balls 3 as shown in FIG. 7 may be a cause to shorten a service life of the balls 3. To reduce unevenness of the distribution of the balls 3, the diameter of the ball 3 in the circulation path 5a close to the flange 2-2 of the nut 2 (refer to FIG. 2) is set smaller than the diameters of the balls 3 in the circulation paths 5b, 5c remote from the flange 2-2 of the nut 2. In this embodiment, since the first to third circulation paths 5a to 5c are arranged as illustrated in FIG. 2, the diameter of the ball 3a in the first circulation path 5a is set smaller than the diameter of the ball 3b in the second circulation path 5b, and the diameter of the ball 3b in the second circulation path 5b is set smaller than the diameter of the ball 3c in the third circulation path 5c. In other words, the diameter of the ball 3a in the first circulation path 5a is set small, the diameter of the ball 3b in the second circulation path 5b is set medium, and the diameter of the ball 3c in the third circulation path 5c is set large. The diameters of the respective balls 3a to 3c in the respective circulation paths 5a to 5c are set equal. In other words, the sizes of the respective balls 3a to 3c are unified to the same sizes in the respective circulation paths 5a to 5c. Actually, steel balls from the same lot are used (ball lot: constant number of steel balls manufactured under the conditions deemed equal and treated as the same products).

Here, the balls 3a to 3c are housed in the respective first to third circulation paths 5a to 5c. The diameter of the ball 3a in the first circulation path 5a indicates a mean value of the diameters of the balls 3a accommodated in the first circulation path 5a. In a similar manner, the diameter of the ball 3b in the second circulation path 5b indicates a mean value of the diameters of the balls 3b accommodated in the second circulation path 5b, and the diameter of the ball 3c in the third circulation path 5c indicates a mean value of the diameters of the balls 3c accommodated in the third circulation path 5c. Additionally, a mean diameter (mean ball diameter) $D_{Wm}$ specified in "Rolling bearing—Steel balls in JIS B1501" can be used in a measuring method for a diameter of each ball 3a, 3b, or 3c. The mean diameter indicates an arithmetic mean value obtained from a maximal value and a minimal value of measured diameters of one steel ball.

The calculation method for the differences between the diameters of the balls in the first to third circulation paths 5a to 5c is as described below. First, the mean groove displacement difference $\delta_{21}$ between the first circulation path 5a and the second circulation path 5b is calculated from FIG. 6, and the mean groove displacement difference $\delta_{32}$ between the second circulation path 5b and the third circulation path 5c is calculated. In this example, $\delta_{21}$ is calculated as 15.4 μm, and $\delta_{32}$ is calculated as 5.8 μm. Upon calculating the differences, the displacement differences of the respective circulation paths 5a to 5c at the center in the axial direction are defined as mean groove displacement differences $\delta_1$ to $\delta_3$.

Next, since $\delta_{21}$ and $\delta_{32}$ are the displacement differences in the axial direction, $\delta_{21}$ and $\delta_{32}$ are converted to displacement differences ΔD in the contact angle direction. Utilizing the lead angle γ (refer to FIG. 4) and the contact angle α (refer to FIG. 4), ΔD can be obtained from Formula 1 below.

$$\Delta D = \delta \times \cos\gamma \times \sin\alpha \quad \text{(Formula 1)}$$

In the case of $\delta_{21}$=15.4 μm, γ=4.4°, and α=55°, the results turn out to be $\Delta D_{21} = \delta_{21} \times \cos\gamma \times \sin\alpha$ = 12.5 μm and $\Delta D_{32} = \delta_{32} \times \cos\gamma \times \sin\alpha$ = 4.7 μm. In the case where $\Delta D_{21}$ is regarded as a difference between the diameters of the balls in the first circulation path 5a and the second circulation path 5b, and $\Delta D_{32}$ is regarded as a difference between the diameters of the balls in the second circulation path 5b and the third circulation path 5c, the diameters of the balls are changed in accordance with change of a clearance.

Finally, the diameter of the ball in the first circulation path 5a is set smaller than the diameter of the ball in the second circulation path 5b by 12.5 μm without changing the diameter of the ball in the second circulation path 5b. Additionally, the diameter of the ball in the third circulation path 5c is set larger than the diameter of the ball in the second circulation path 5b by 4.7 μm. Thus, the difference between the diameter of the ball in the second circulation path 5b and the diameter of the ball in the first circulation path 5a is set larger than the difference between the diameter of the ball in the third circulation path 5c and the diameter of the ball in the second circulation path 5b. Consequently, it is possible to reduce unevenness of the load distribution of the balls 3 which is increased in the quadratic curve with approach to the flange 2-2 as illustrated in FIG. 7.

Figure 8:
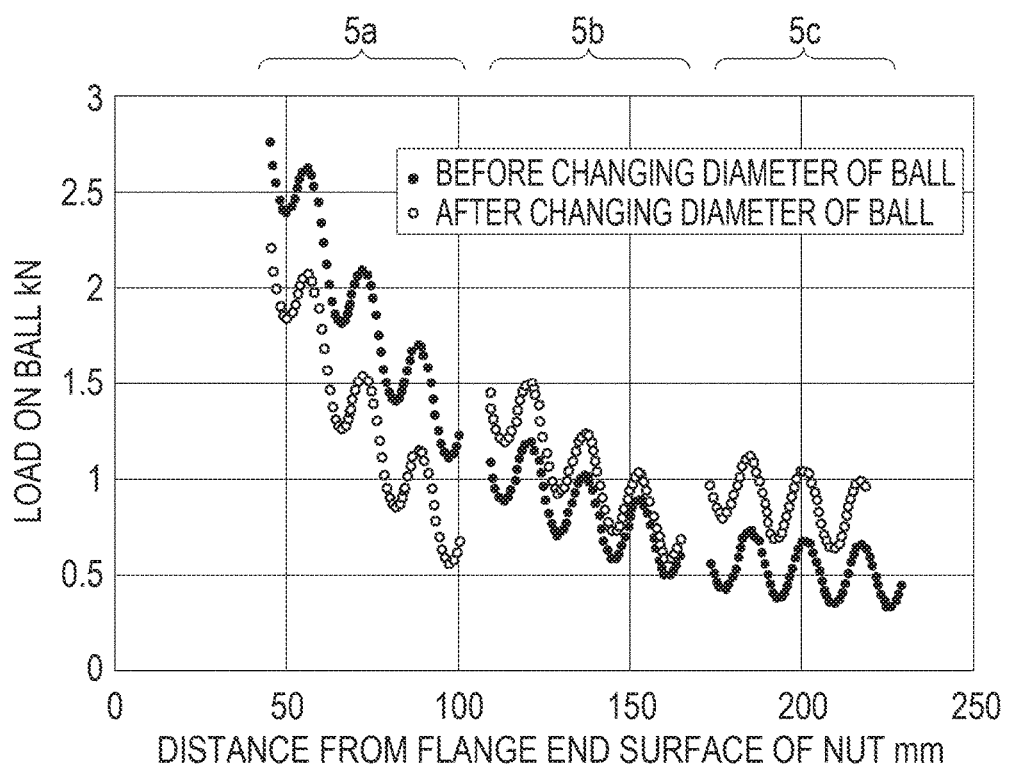
FIG. 8 is a graph illustrating load distribution of balls (marks ● in the graph represent before changing the diameters of balls, and marks ○ in the graph represent after changing the diameters of balls diameter).

FIG. 8 is a graph comparing the load distribution of the balls between before changing the diameters of the balls and after changing the same. The marks ● in the graph represent before the change, and the marks ○ in the graph represent after the change. It can be grasped that unevenness of the load distribution is improved and the loads on the balls are leveled by changing the diameters of the balls. Upon calculating a service life of the ball screw before and after changing the diameters of the balls, the service life is extended 1.5 times. According to the present embodiment, unevenness of the load distribution of the balls 3 can be reduced without providing any special processing to the loaded ball rolling groove 2a of the nut 2. Therefore, manufacture of the ball screw is facilitated.

Meanwhile, even when a load directed in the direction opposing to the axial load Fa of FIG. 3 (load directed leftward in FIG. 3) acts on the flange 2-2 of the nut 2, unevenness of the load distribution can be improved by changing the diameters of the balls as described above. The reason is that the screw shaft 1 has higher rigidity and is more hardly deformed with approach to the end 9 of the screw shaft 1 on the fixed side as described in the above elastic deformation of the screw shaft 1. The nut 2 has higher rigidity and is more hardly deformed with approach to the flange 2-2 as described in the above elastic deformation of the nut 2. Therefore, the nut 2 and the screw shaft 1 are more hardly deformed and a larger load acts on the ball 3 with approach to the flange 2-2. In contrast, the nut 2 and the screw shaft 1 are more easily deformed and a less load acts on the ball 3 with distance from the flange 2-2.

Furthermore, in the above-described first embodiment, the three circulation paths are arranged in the axial direction of the nut, the diameter of the ball in the first circulation path is set as small, the diameter of the ball in the second circulation path is set as medium, and the diameter of the ball in the third circulation path is set as large. However, since the difference between the load on the ball in the second circulation path and the load on the ball in the third circulation path is little as illustrated in FIG. 7, it may be possible to equalize the diameter of the ball in the second circulation path and the diameter of the ball in the third circulation path.

Second Embodiment

Figure 9:
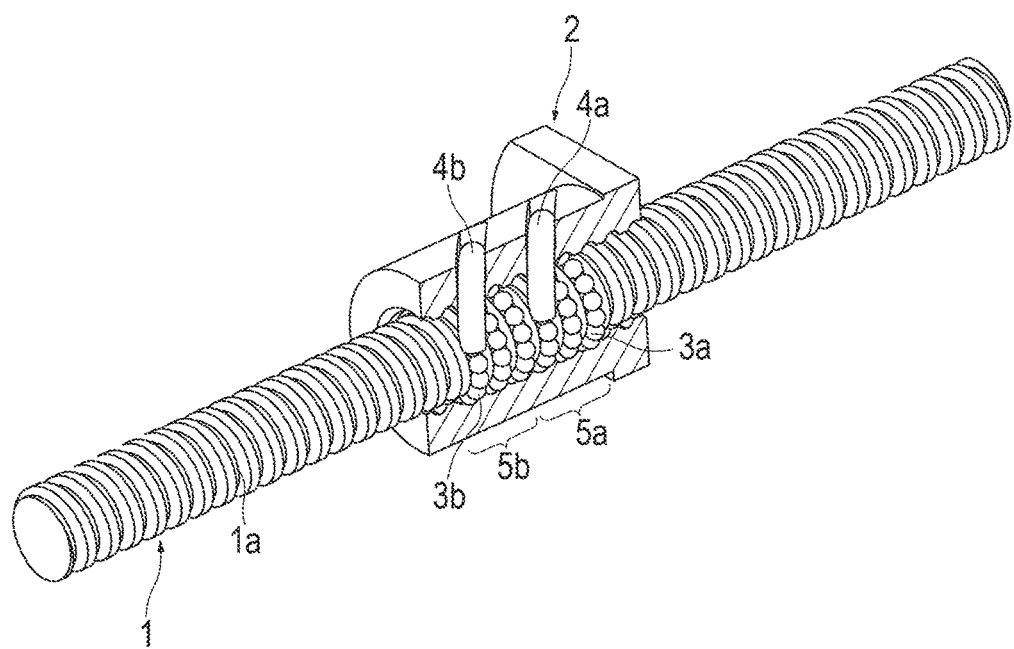
FIG. 9 is a perspective view of a ball screw according to a second embodiment of the present invention (including a cross-section taken along an axial line of a nut).

FIG. 9 is a perspective view of a ball screw according to a second embodiment of the present invention. In the above-described first embodiment, an example of arranging three circulation paths in the axial direction of the nut has been described, but two circulation paths 5a, 5b may also be arranged in the axial direction of the nut 2 as illustrated in FIG. 9. In this case, the diameter of the ball 3a in the circulation path 5a close to the flange 2-2 of the nut 2 is set smaller than the diameter of the ball 3b in the circulation path 5b remote from the flange 2-2 of the nut.

Third Embodiment

Figure 10:
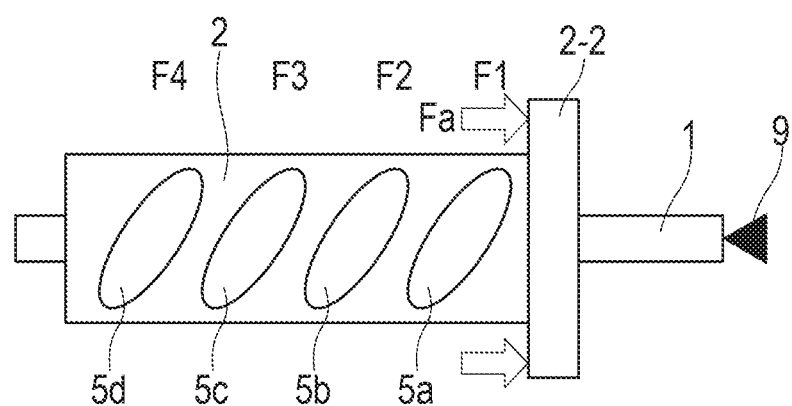
FIG. 10 is a plan view of a ball screw according to a third embodiment of the present invention.

FIG. 10 is a plan view of a ball screw according to a third embodiment of the present invention. In the third embodiment, four circulation paths 5a to 5d are arranged in the axial direction of the nut 2. The position ▲ in FIG. 10 represents the end 9 of the screw shaft 1 on the fixed side. The four circulation paths 5a to 5d include a first circulation path 5a, a second circulation path 5b, a third circulation path 5c, and a fourth circulation path 5d arranged in a direction from a close side to a remote side of the flange 2-2 of the nut 2. Additionally, the diameter of the ball in the first circulation path 5a is defined as F1, the diameter of the ball in the second circulation path 5b as F2, the diameter of the ball in the third circulation path 5c as F3, and the diameter of the ball in the fourth circulation path 5d as F4.

In the ball screw according to the third embodiment, the relation of F1<F2<F3<F4 is satisfied. Since the diameters F1 to F4 of the balls are thus set, unevenness of the load distribution can be improved in a manner similar to the ball screw according to the first embodiment. Additionally, the relation of (F2−F1)>(F3−F2)>(F4−F3) is satisfied. Since the diameters F1 to F4 of the balls are thus set, it is possible to reduce unevenness of the load distribution of the balls 3 which is increased in a quadratic curve with approach to the flange 2-2. Meanwhile, desirably, F4 is set as a reference diameter of the ball and other diameters of the balls are set to become smaller in the order of F3, F2, F1.

Fourth Embodiment

Figure 11:
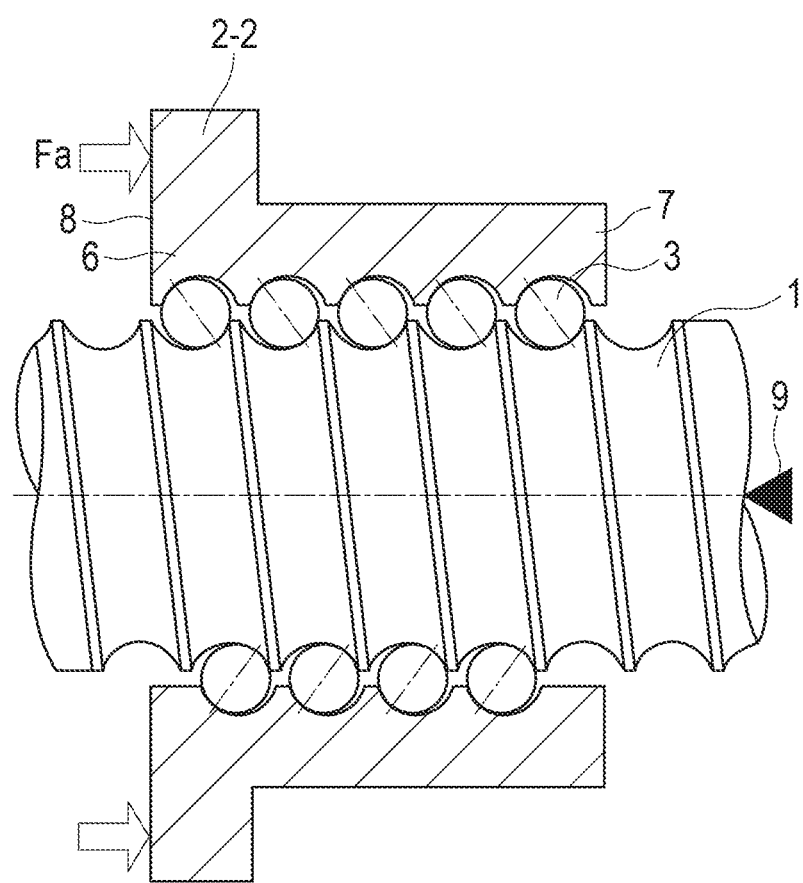
FIG. 11 is a cross-sectional view of the ball screw when an axial load is applied to a flange of the nut (when a load Fa is applied to a free end side of the screw shaft 1).
Figure 12:
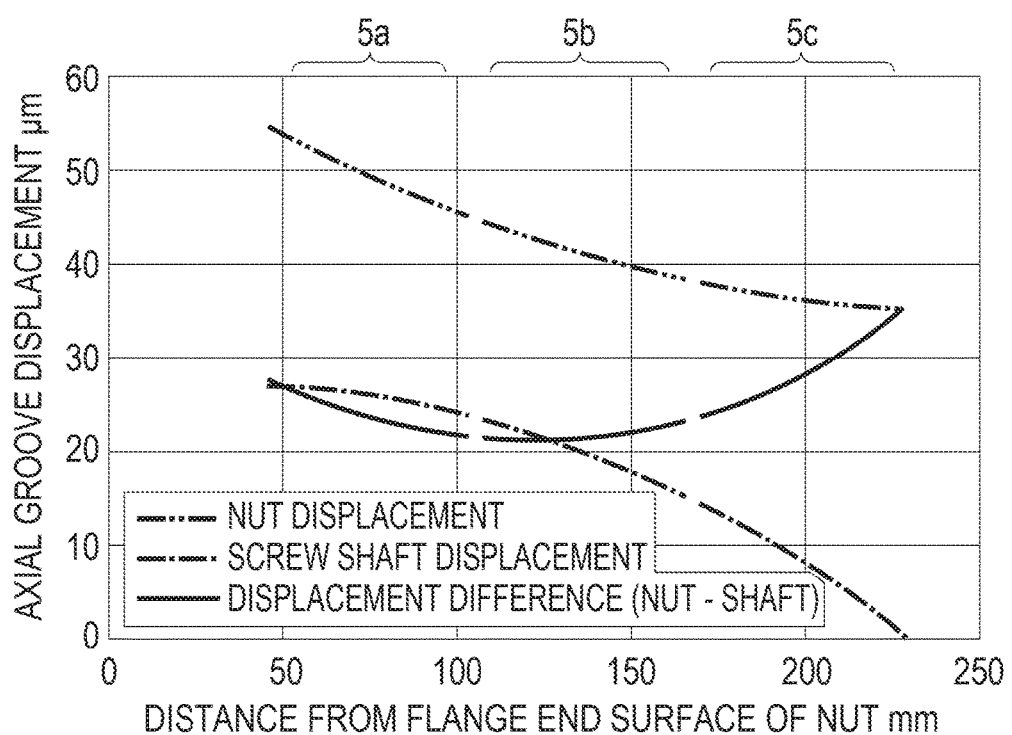
FIG. 12 is a graph illustrating a relation between a distance from a flange end surface of the nut and axial groove displacement of the nut and the screw shaft when the load illustrated in FIG. 11 is applied.

As illustrated in FIG. 11, there may be a case where the one end part 6 of the nut 2 on the flange 2-2 side is remoter from the end 9 of the screw shaft 1 on the fixed side than the other end part 7 of the nut 2 on the side opposite the flange 2-2 is. FIG. 12 is a graph illustrating deformation of the ball rolling groove 1a of the screw shaft 1 and the loaded ball rolling groove 2a of the nut 2 when a load Fa is applied to the flange 2-2 in the ball screw illustrated in FIG. 11. As illustrated in FIG. 12, the axial (rightward) displacement of both of the ball rolling groove 1a of the screw shaft 1 and the loaded ball rolling groove 2a of the nut 2 is reduced with distance from the end surface 8 of the flange 2-2 of the nut 2 (refer to FIG. 11). As illustrated by the solid line in FIG. 12, the displacement difference between the loaded ball rolling groove 2a of the nut 2 and the ball rolling groove 1a of the screw shaft 1 is once decreased and then increased. However, the displacement difference illustrated in FIG. 12 is not as large as the displacement difference illustrated by the solid line in FIG. 5. In other words, compared to when the load Fa illustrated in FIG. 3 is applied, unevenness of the load distribution of the balls 3 is not so large when the load Fa illustrated in FIG. 11 is applied, but still there is unevenness. The ball screw according to the fourth embodiment of the present invention is directed to improving such unevenness of load distribution.

Figure 13:
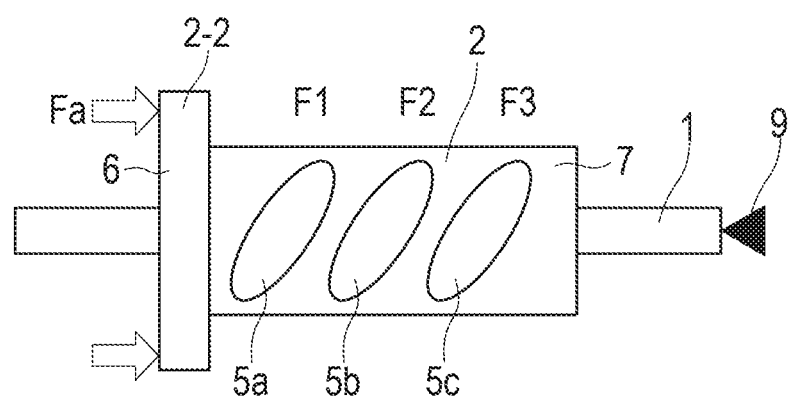
FIG. 13 is a plan view of a ball screw according to a fourth embodiment of the present invention.

FIG. 13 is a plan view of a ball screw according to the fourth embodiment of the present invention. The position ▲ in FIG. 13 represents the end 9 of the screw shaft 1 on the fixed side. In this embodiment, the one end part 6 of the nut 2 on the flange 2-2 side is remoter from the end 9 of the screw shaft 1 on the fixed side than the other end part 7 of the nut 2 on the side opposite the flange 2-2 is. Three circulation paths 5a to 5c are arranged in the axial direction of the nut 2. The three circulation paths 5a to 5c include a first circulation path 5a, a second circulation path 5b, and a third circulation path 5c arranged in a direction from a close side to a remote side of the flange 2-2 of the nut 2. The diameter of the ball in the first circulation path 5a is defined as F1, the diameter of the ball in the second circulation path 5b as F2, and the diameter of the ball in a third circulation path 5c as F3.

The growing tendency of the displacement difference (nut–shaft) illustrated in FIG. 12 is caused by the displacement characteristic in FIG. 12 in which the displacement width of the screw shaft is larger than the displacement width of the nut. This is caused by the axial rigidity difference between the nut 2 and the screw shaft 1, and in the case of having the same material quality, this is caused by a fact that the cross-sectional area of the nut 2 is larger than the cross-sectional area of the screw shaft 1. In the following, a description will be provided for separate cases: the case where the cross-sectional area of the nut 2 is larger than the cross-sectional area of the screw shaft 1 (cross-sectional area of nut>cross-sectional area of screw shaft); and the case where the cross-sectional area of the nut 2 is smaller than the cross-sectional area of the screw shaft 1 (cross-sectional area of nut<cross-sectional area of screw shaft).

Meanwhile, the cross-sectional area of the nut 2 indicates a cross-sectional area of the nut 2 within a plane orthogonal to the axial direction. The cross-sectional area of the nut 2 can be calculated by subtracting the portions of the loaded ball rolling grooves 2a1 to 2a5 (refer to FIG. 4) from the area calculated from the outer diameter and the inner diameter of the nut 2. Here, the cross-sectional area of the flange 2-2 and subtraction of the portions of the return pipes 4a to 4c are disregarded. Additionally, the cross-sectional area of the screw shaft 1 indicates a cross-sectional area of the screw shaft 1 within a plane orthogonal to the axial direction. The cross-sectional area of the screw shaft 1 can be calculated by subtracting the portions of the ball rolling grooves 1a1 to 1a5 (refer to FIG. 4) from the area calculated from the outer diameter of the screw shaft 1.

Figure 14A:
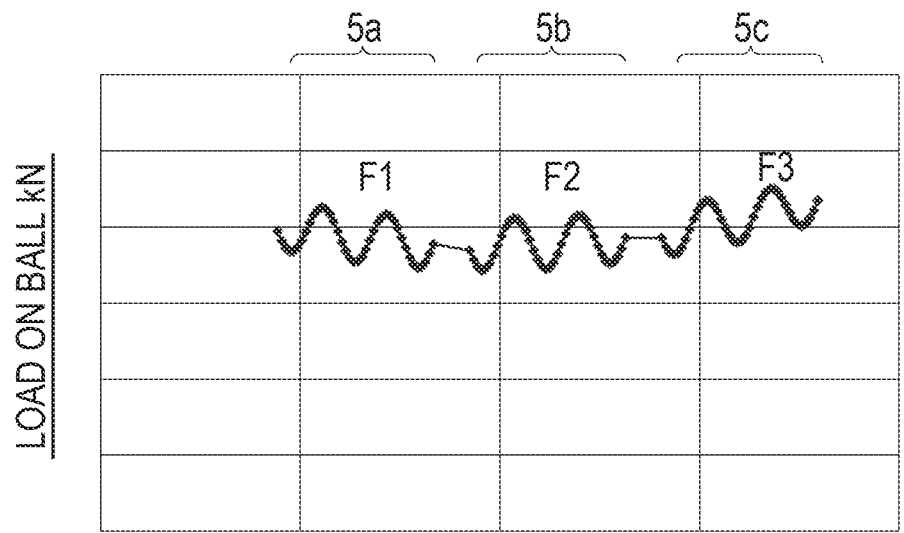
FIG. 14 is a graph illustrating a relation between a distance from a flange end surface of a nut and the loads on the balls (FIG. 14A is a case where a cross-sectional area of the nut is larger than a cross-sectional area of the screw shaft, and FIG. 14B is a case where the cross-sectional area of the nut is smaller than the cross-sectional area of the screw shaft).

FIG. 14A is a graph illustrating the loads on the balls in the case where the cross-sectional area of the nut is larger than the cross-sectional area of the screw shaft. In the case where the cross-sectional area of the nut is larger than the cross-sectional area of the screw shaft, the axial rigidity of the screw shaft 1 is lower than the axial rigidity of the nut 2, and the displacement width of the screw shaft is larger than the displacement width of the nut in a manner similar to FIG. 12. Therefore, the displacement difference (nut–shaft) has a growing tendency in a manner similar to FIG. 12, and the loads on the balls also has a growing tendency as illustrated in FIG. 14A. Consequently, in the case where the cross-sectional area of the nut is larger than the cross-sectional area of the screw shaft, the diameters of the ball are set to satisfy F1>F2>F3. As a result, unevenness of the load distribution is improved. However, the load on the ball in the first circulation path 5a is substantially equal to the load on the ball in the second circulation path 5b as illustrated in FIG. 14A. Therefore, the diameters of the balls may also be set to satisfy F1=F2>F3.

Figure 14B:
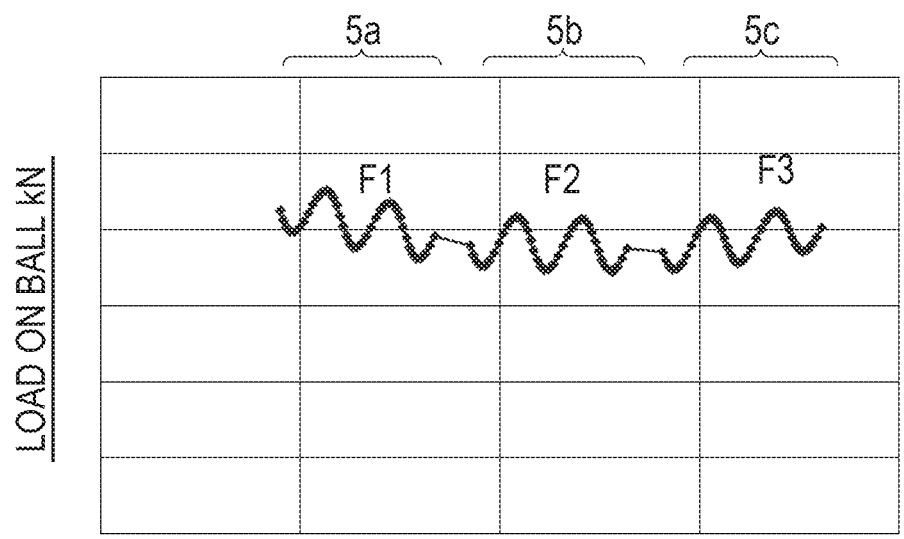

FIG. 14B illustrates the loads on the balls in the case where the cross-sectional area of the nut is smaller than the cross-sectional area of the screw shaft. In this case, the axial rigidity of the screw shaft 1 is higher than the axial rigidity of the nut 2, and the displacement width of the screw shaft is smaller than the displacement width of the nut. Therefore, the displacement difference (nut–shaft) has a decreasing tendency in contrast to the tendency illustrated in FIG. 12, and the loads on the balls also has a decreasing tendency as illustrated in FIG. 14B. Consequently, in the case where the cross-sectional area of the nut is smaller than the cross-sectional area of the screw shaft, the diameters of the balls are set to satisfy F1<F2<F3. As a result, unevenness of the load distribution is improved. However, the load on the ball in the second circulation path 5b is substantially equal to the load on the ball in the third circulation path 5c as illustrated in FIG. 14B. Therefore, the diameters of the balls may also be set to satisfy F1<F2=F3.

Figure 15A:
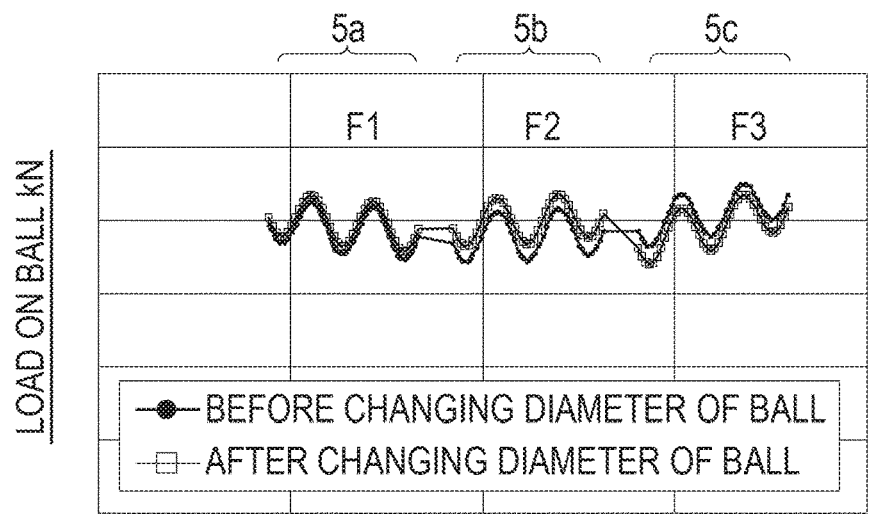
FIG. 15 is a graph illustrating a relation between a distance from the flange end surface of the nut and the loads on the balls (FIG. 15A is a case where the cross-sectional area of the nut is larger than the cross-sectional area of the screw shaft, and FIG. 15B is a case where the cross-sectional area of the nut is smaller than the cross-sectional area of the screw shaft).
Figure 15B:
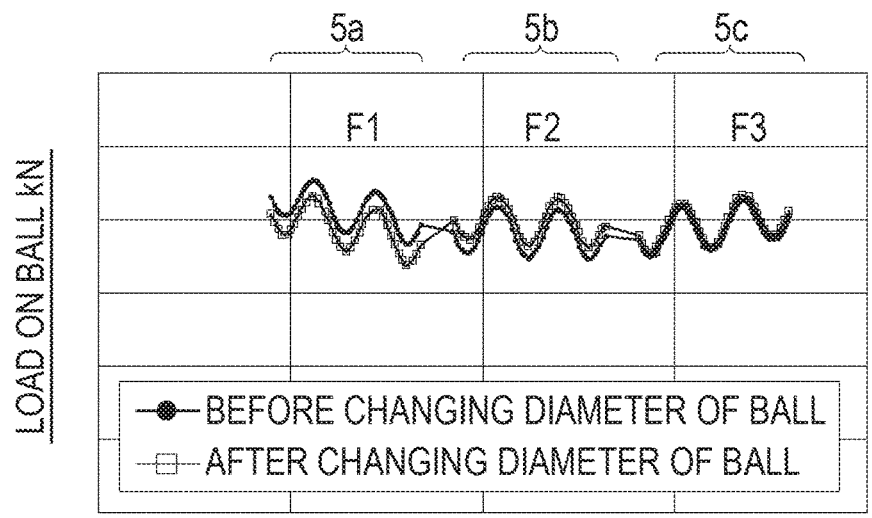

In FIGS. 15A and 15B, the load distribution of the balls is compared between before and after changing the diameters of the balls. FIG. 15A is the case where the cross-sectional area of the nut is larger than the cross-sectional area of the screw shaft, and FIG. 15B is the case where the cross-sectional area of the nut is smaller than the cross-sectional area of the screw shaft. The marks ● in the graph represent before the change, and the marks □ in the graph represent after the change. It can be grasped that unevenness of the load distribution is improved and the loads on the balls are leveled by changing the diameters of the balls.

It should be noted that the present invention is not limited to the above-described embodiments, and various embodiments can be achieved without changing the spirit and scope of the present invention.

In the above-described embodiments, the description has been provided for the example in which the nut is provided with a return path which is connected between one end and the other end of the loaded ball rolling groove and is formed of a return pipe, but the return path may also be formed of a penetration hole parallel to the axial line of the nut and end pieces mounted on both ends of the penetration hole.

In the above-described embodiments, the ball rolling groove of the screw shaft and the loaded ball rolling groove of the nut each have a cross-sectional shape of a Gothic arch groove configured by two arcs, but may also each have a cross-sectional shape of a circular arc groove configured by a single arc.

The calculation method for the differences between the diameters of the balls in the first to third circulation paths in the above first embodiment is an example, and other calculation methods may also be adopted.

In the above-described embodiments, rotation of the screw shaft relative to the nut is relative, and the screw shaft may also be rotated or the nut may also be rotated.

In the above-described embodiments, the example of having a signal nut has been described, but two or more small nuts may also be connected and incorporated as one nut. In this case, the two or more small nuts are regarded as one nut, and diameters of balls in two or more circulation paths are set.

In the above-described embodiments, the examples of providing two to four circulation paths have been described, but five or more circulation paths may also be provided.

INDUSTRIAL APPLICABILITY

The ball screw according to the present invention is suitable to be applied to a press machine, a bending machine, an injection molding machine, a compression molding machine or the like, in which a large axial load acts on the ball screw. The reason is that a service life of the ball screw can be extended by reducing unevenness of load distribution of balls. However, usage of the ball screw according to the present invention is not limited.

The present specification is based on Japanese Patent Application No. 2014-265564 filed on Dec. 26, 2014 and No. 2015-251693 filed on Dec. 24, 2015. The entire disclosure thereof is incorporated herein by reference.

REFERENCE SIGNS LIST

1 Screw shaft
1a Ball rolling groove
2 Nut
2a Loaded ball rolling groove
2-2 Flange
3 Ball
4a, 4b, 4c Return pipe (return path)
5a First circulation path
5b Second circulation path
5c Third circulation path
6 One end part of nut on flange side (one end part of nut on attachment part side)
7 Other end part of nut on side opposite flange (other end part of nut on side opposite attachment part)
9 End of screw shaft on fixed side

The invention claimed is:

1. A ball screw comprising:
a screw shaft having a helical ball rolling groove formed on an outer peripheral surface thereof;
a nut having a helical loaded ball rolling groove formed on an inner peripheral surface thereof and facing the ball rolling groove, the nut further including an attachment part to be attached to a mating component;
a plurality of balls interposed between the ball rolling groove of the screw shaft and the loaded ball rolling groove of the nut in a rollable manner, the plurality of balls including at least a first group of balls, a second group of balls, and a third group of balls; and
at least a first circulation path, a second circulation path, and a third circulation path, each of the first, second, and third circulation paths including a return path connected between one end and the other end of the loaded ball rolling groove of the nut, the first circulation path being configured to circulate the first group of balls, the second circulation path being configured to circulate the second group of balls, and the third circulation path being configured to circulate the third group of balls,
wherein one end part of the nut on the attachment part side is closer to an end of the screw shaft on a fixed side than the other end part of the nut on a side opposite the attachment part is,
the first, second, and third circulation paths are arranged in an axial direction of the nut, the first circulation path, the second circulation path, and the third circulation path being respectively arranged in the axial direction of the nut from a side close to the attachment part of the nut to a side remote from the attachment part,
a diameter of the balls of the first group of balls in the first circulation path closest to the attachment part of the nut among the plurality of circulation paths is smaller than a diameter of the balls of the second group of balls in the second circulation path and smaller than a diameter of the balls of the third group of balls in the third circulation path most remote from the attachment part of the nut among the plurality of circulation paths, and the diameter of the balls of the second group of balls in the second circulation path is equal to or less than the diameter of the balls of the third group of balls in the third circulation path.

2. The ball screw according to claim 1, wherein a difference between the diameter of the balls of the second group of balls in the second circulation path and the diameter of the balls of the first group of balls in the first circulation path is larger than a difference between the diameter of the balls of the third group of balls in the third circulation path and the diameter of the balls of the second group of balls in the second circulation path.

3. A ball screw comprising:

a screw shaft having a helical ball rolling groove formed on an outer peripheral surface thereof;

a nut having a helical loaded ball rolling groove formed on an inner peripheral surface thereof and facing the ball rolling groove, the nut further including an attachment part to be attached to a mating component;

a plurality of balls interposed between the ball rolling groove of the screw shaft and the loaded ball rolling groove of the nut in a rollable manner, the plurality of balls including at least a first group of balls, a second group of balls, and a third group of balls; and at least a first circulation path, a second circulation path, and a third circulation path, each of the first, second, and third circulation paths including a return path connected between one end and the other end of the loaded ball rolling groove of the nut, first circulation path being configured to circulate the first group of balls, the second circulation path being configured to circulate the second group of balls, and the third circulation path being configured to circulate the third group of balls, wherein one end part of the nut on the attachment part side is more remote from an end of the screw shaft on a fixed side than the other end part of the nut on a side opposite the attachment part is, the first, second, and third circulation paths are arranged in an axial direction of the nut, the first circulation path, the second circulation path, and the third circulation path being respectively arranged in the axial direction of the nut from a side close to the attachment part of the nut to a side remote from the attachment part, a cross-sectional area of the nut in a cross section perpendicular to an axis of the screw shaft is larger than a cross-sectional area of the screw shaft in the cross section perpendicular to the axis of the screw shaft, and a diameter of the balls of the first group of balls in the first circulation path closest to the attachment part of the nut among the plurality of circulation paths is equal to or larger than a diameter of the balls of the second group of balls in the second circulation path and larger than a diameter of the balls of the third group of balls in the third circulation path most remote from the attachment part of the nut among the plurality of circulation paths, and the diameter of the balls of the second group of balls in the second circulation path is larger than the diameter of the balls of the third group of balls in the third circulation path.

4. The ball screw according to claim 3, wherein a difference between the diameter of the balls of the first group of balls in the first circulation path and the diameter of the balls of the second group of balls in the second circulation path is less than a difference between the diameter of the balls of the second group of balls in the second circulation path and the diameter of the balls of the third group of balls in the third circulation path.

* * * * *